US008464704B2

(12) United States Patent
Brown

(10) Patent No.: US 8,464,704 B2
(45) Date of Patent: Jun. 18, 2013

(54) COMBUSTION APPARATUS FOR SOLID FUEL

(76) Inventor: Stephen Charles Brown, Langley (CA)

( * ) Notice: Subject to any disclaimer, the term of this patent is extended or adjusted under 35 U.S.C. 154(b) by 1095 days.

(21) Appl. No.: 11/578,489

(22) PCT Filed: Apr. 14, 2005

(86) PCT No.: PCT/CA2005/000571
§ 371 (c)(1),
(2), (4) Date: Aug. 27, 2007

(87) PCT Pub. No.: WO2005/100861
PCT Pub. Date: Oct. 27, 2005

(65) Prior Publication Data
US 2008/0041357 A1     Feb. 21, 2008

(30) Foreign Application Priority Data

Apr. 15, 2004 (CA) .................................. 2464490

(51) Int. Cl.
*F24C 1/14* (2006.01)
(52) U.S. Cl.
USPC .................. 126/77; 126/200; 110/233; 431/2
(58) Field of Classification Search
USPC ..................................... 126/190, 193, 200, 77
See application file for complete search history.

(56) References Cited

U.S. PATENT DOCUMENTS

| 38,361 | A | * | 4/1863 | Stewart | 126/77 |
|---|---|---|---|---|---|
| 320,783 | A | * | 6/1885 | Hess et al. | 126/58 |
| 419,122 | A | * | 1/1890 | Higgins | 126/69 |
| 4,141,336 | A | * | 2/1979 | Fitch | 126/502 |
| 4,192,285 | A | * | 3/1980 | Nietupski | 126/83 |
| 4,200,086 | A | * | 4/1980 | Kolb | 126/66 |
| 4,201,185 | A | * | 5/1980 | Black | 126/77 |
| 4,206,743 | A | * | 6/1980 | Niemela | 126/110 B |
| 4,207,861 | A | * | 6/1980 | Buckner | 126/83 |
| 4,221,207 | A | * | 9/1980 | Syme | 126/77 |
| 4,319,556 | A | * | 3/1982 | Schwartz et al. | 126/77 |
| 4,363,785 | A | * | 12/1982 | Willson | 422/173 |
| 4,392,477 | A | * | 7/1983 | Milligan | 126/77 |
| 4,404,953 | A | * | 9/1983 | Thulman et al. | 126/77 |
| 4,461,242 | A | * | 7/1984 | Black | 122/16.1 |
| 4,469,083 | A | * | 9/1984 | Helle et al. | 126/61 |
| 4,475,529 | A | * | 10/1984 | Milligan | 126/77 |
| 4,475,533 | A | * | 10/1984 | Milligan | 126/279 |
| 4,487,195 | A | * | 12/1984 | Syme et al. | 126/77 |

(Continued)

FOREIGN PATENT DOCUMENTS

FR   2556079  A1 *  6/1985
GB   2172989  A   * 10/1986

(Continued)

*Primary Examiner* — Steven B McAllister
*Assistant Examiner* — Desmond C Peyton
(74) *Attorney, Agent, or Firm* — Laurence C. Bonar

(57) ABSTRACT

A combustion apparatus for the burning of solid fuel using a plurality of secondary combustion zones is disclosed. The combustion apparatus includes primary and secondary air inlets, an inclined hearth and a unique second air source which washes up a window in the combustion apparatus creating a floating flame effect and rendering the window self-cleaning. A series of baffles define a secondary combustion pathway which optimizes secondary combustion of exhaust gasses and particulate matter. Coaxial rear and top direct venting apparatus are also disclosed. The combustion apparatus provided combusts a wide range of solid fuel at a high level of efficiency.

41 Claims, 11 Drawing Sheets

U.S. PATENT DOCUMENTS

| | | | | |
|---|---|---|---|---|
| 4,494,525 A * | 1/1985 | Albertsen | ............ | 126/289 |
| 4,556,044 A * | 12/1985 | Barsness et al. | ............ | 126/77 |
| 4,561,420 A * | 12/1985 | Thomsen | ............ | 126/77 |
| 4,582,044 A * | 4/1986 | Ferguson et al. | ............ | 126/289 |
| 4,582,045 A * | 4/1986 | Dorau et al. | ............ | 126/290 |
| 4,611,572 A * | 9/1986 | Martenson | ............ | 126/77 |
| 4,621,610 A * | 11/1986 | Tomooka | ............ | 126/61 |
| 4,656,956 A * | 4/1987 | Flickinger et al. | ............ | 110/233 |
| 4,658,801 A * | 4/1987 | Black | ............ | 126/77 |
| 4,665,889 A * | 5/1987 | Rumens et al. | ............ | 126/77 |
| 4,672,946 A * | 6/1987 | Craver | ............ | 126/77 |
| 4,766,876 A * | 8/1988 | Henry et al. | ............ | 126/77 |
| 4,825,845 A * | 5/1989 | Olivotti | ............ | 126/15 R |
| 4,844,051 A * | 7/1989 | Horkey | ............ | 126/58 |
| 4,856,491 A * | 8/1989 | Ferguson et al. | ............ | 126/77 |
| 5,007,404 A * | 4/1991 | Hall et al. | ............ | 126/77 |
| 5,014,683 A * | 5/1991 | Wilkening | ............ | 126/515 |
| 5,113,843 A * | 5/1992 | Henry et al. | ............ | 126/77 |
| 5,123,360 A * | 6/1992 | Burke et al. | ............ | 110/233 |
| 5,137,012 A * | 8/1992 | Crossman et al. | ............ | 126/501 |
| 5,139,008 A * | 8/1992 | Timpano | ............ | 126/77 |
| 5,263,471 A * | 11/1993 | Shimek et al. | ............ | 126/528 |
| 5,341,794 A * | 8/1994 | Henry et al. | ............ | 126/77 |
| 5,357,941 A * | 10/1994 | Hans Duerichen et al. | .. | 126/531 |
| 5,603,312 A * | 2/1997 | Champion et al. | ............ | 126/77 |
| 5,702,244 A * | 12/1997 | Goodson et al. | ............ | 431/2 |
| 6,067,979 A * | 5/2000 | Jaasma et al. | ............ | 126/77 |
| 6,336,449 B1 * | 1/2002 | Drisdelle et al. | ............ | 126/73 |
| 6,688,302 B2 * | 2/2004 | Henry et al. | ............ | 126/77 |
| 6,817,354 B2 * | 11/2004 | Laitinen | ............ | 126/77 |
| 2005/0279344 A1 * | 12/2005 | Cyris | ............ | 126/193 |
| 2007/0044790 A1 * | 3/2007 | Carlo | ............ | 126/512 |

FOREIGN PATENT DOCUMENTS

| | | |
|---|---|---|
| WO | 85/03762 A1 | 8/1985 |
| WO | 90/07089 A1 | 6/1990 |
| WO | 03/048645 A1 | 6/2003 |

* cited by examiner

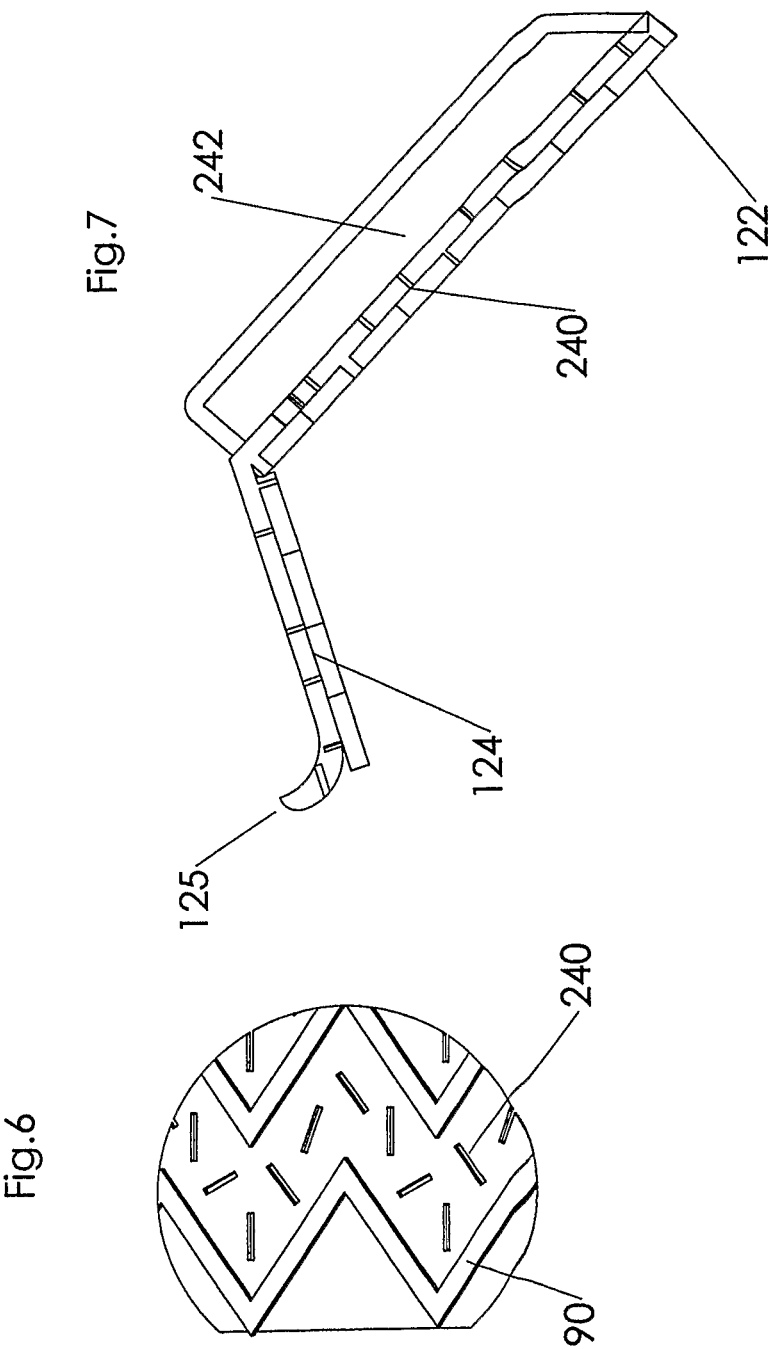

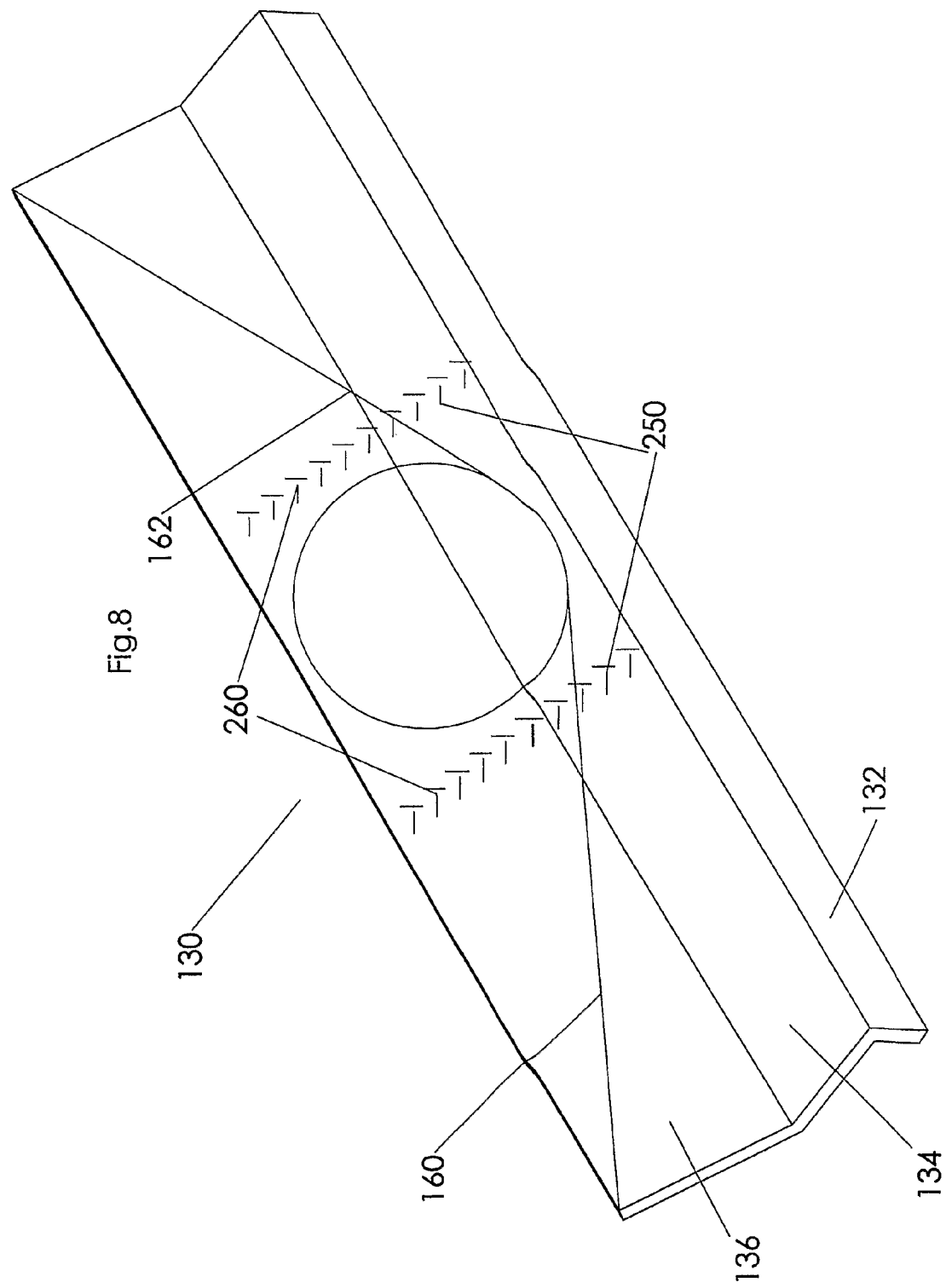

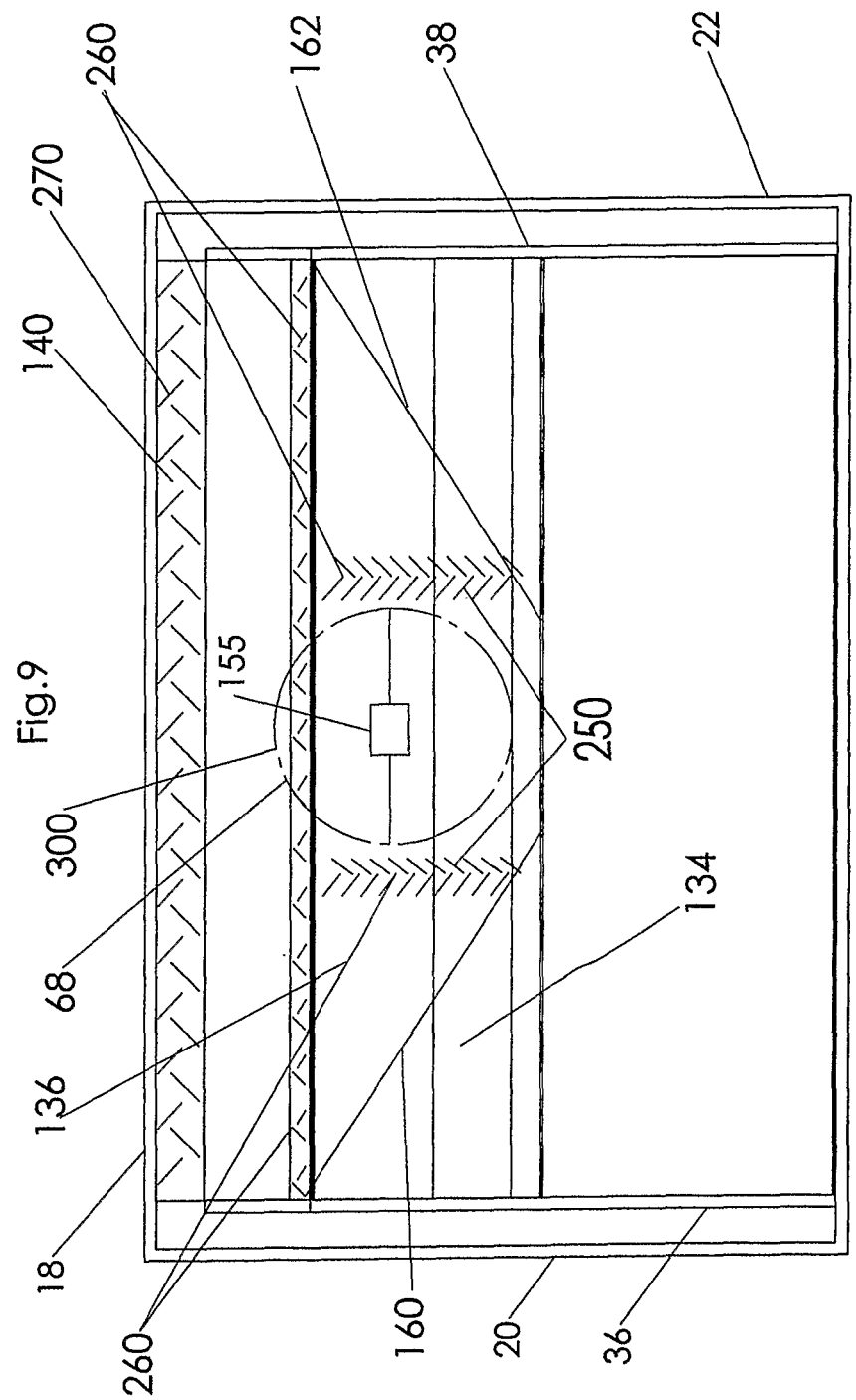

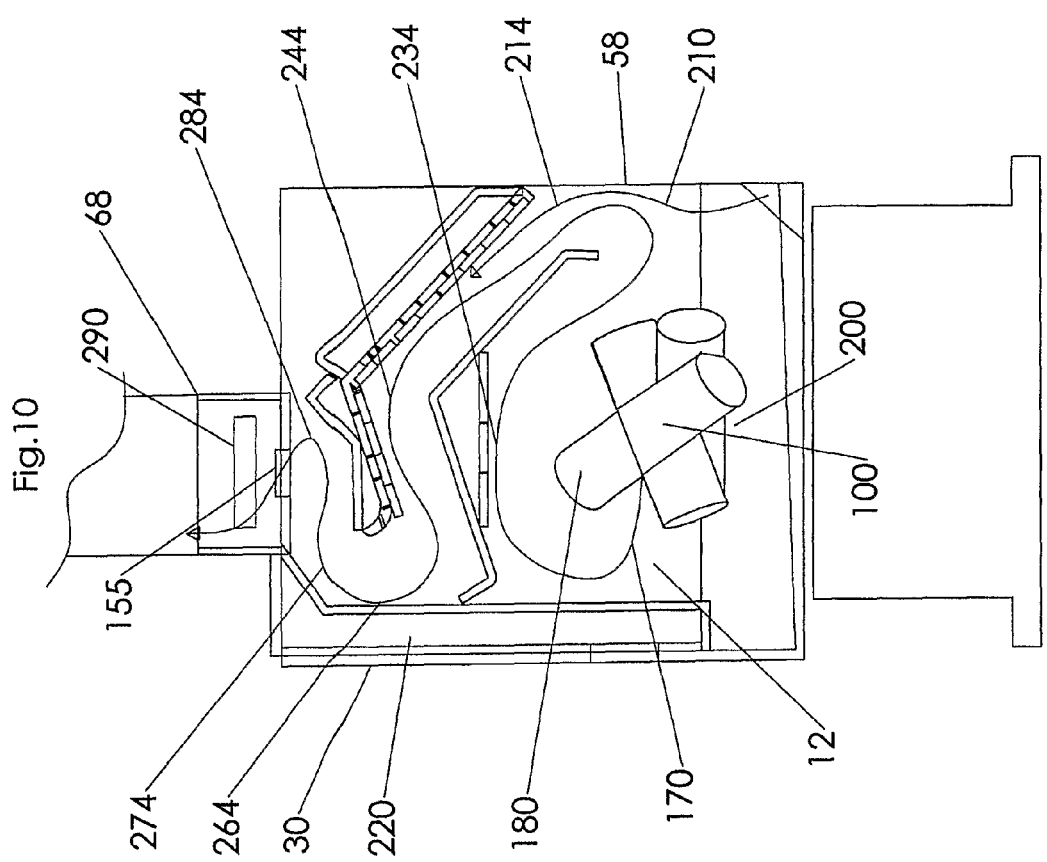

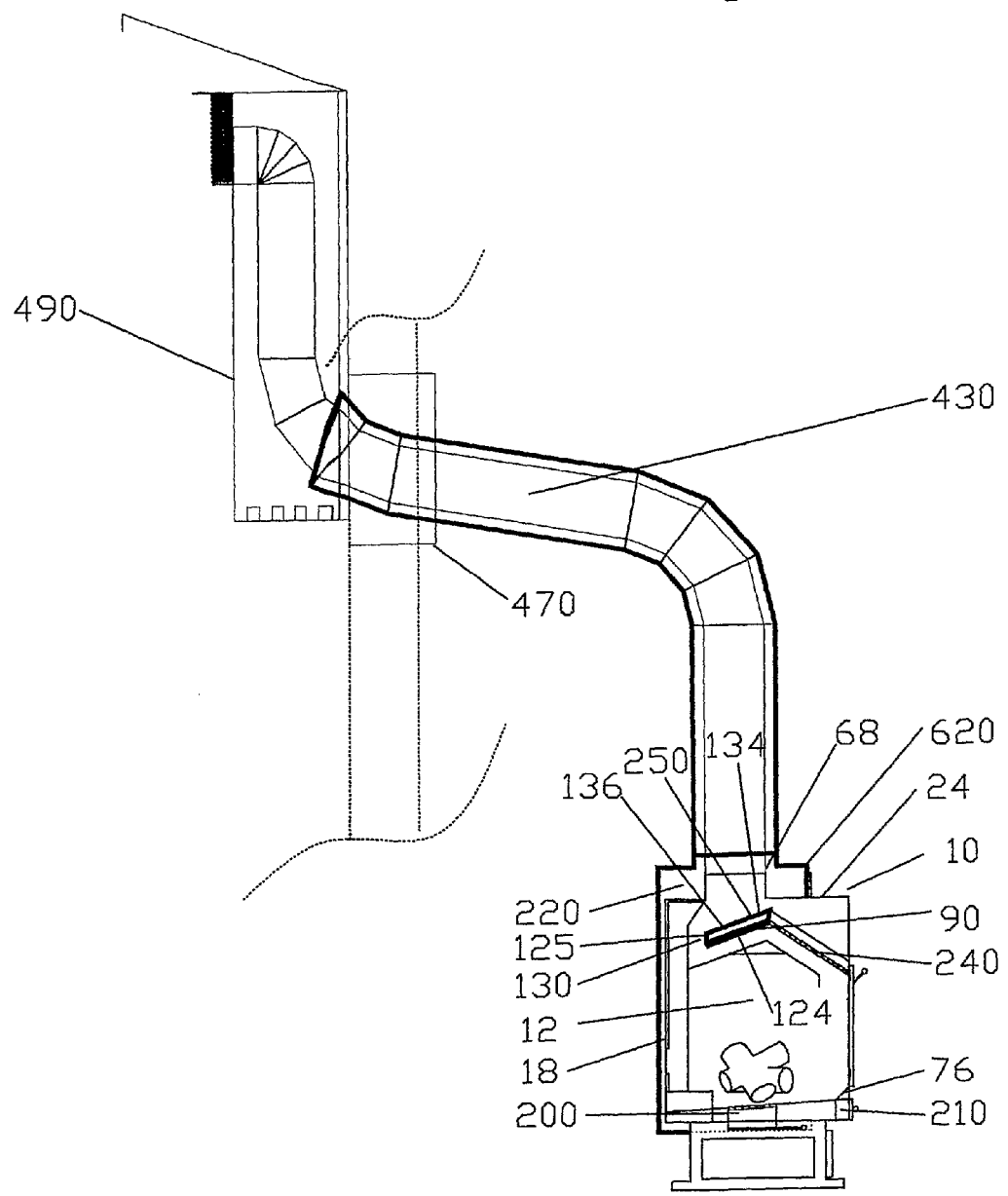

COMBUSTION APPARATUS FOR SOLID FUEL

TECHNICAL FIELD

The present disclosure relates to a secondary combustion apparatus for the burning of solid fuel such as cord wood, coal or wood pellets. More specifically, the disclosure relates to a method and apparatus for burning solid fuel which a enables much greater degree and effectiveness of secondary combustion of volatile combustion products, thereby dramatically reducing smoke emission and greatly improving efficiency.

BACKGROUND OF THE INVENTION

It is well known in the art that a substantial portion of the emissions generated by a solid fuel combustion apparatus are themselves combustible. Conventional solid fuel burning apparatus are extremely inefficient because a substantial portion of the solid fuel's combustible energy is sent up the stack in the form of creosote, oils, tars, heavy combustible gases and smoke (pollution). Therefore, by ensuring more complete combustion of these emissions, the efficiency of the combustion apparatus is greatly improved and the quantity of noxious emissions is greatly reduced.

A common approach to increasing combustion efficiency is to establish secondary combustion. In a conventional wood burning stove the combustion of the solid fuel is generally referred to as primary combustion ("PC"). The region in which primary combustion takes place is referred to as the primary combustion zone ("PCZ"). Typically primary combustion occurs in the lower region of the firebox, on or near the solid fuel situated on the hearth or floor of the appliance. Combustion of the emissions of the PC is referred to as secondary combustion ("SC"), and the region or regions in which SC occurs are referred to as secondary combustion zones ("SCZ"). SC generally occurs above, beyond and "downstream" from the solid fuel PCZ location.

Prior art indicates that many attempts have been made to improve the combustion of solid fuel emissions by SC. These attempts can be divided largely into two groups: combustion apparatus with combustion catalysts and combustion apparatus based on staged primary and secondary combustion.

It is known in the art that the ignition point of the emissions created by solid fuel is about 537° C. (1000° F.). Traditional catalytic converters are typically inserted in the upper region of the firebox to bring the ignition temperature down a few hundred degrees and newer versions are now able to ignite flue gases in the 260° C.-315° C. (500-600° F.) range. Prior art such as "Advanced Techniques for Wood Log Combustion Emission Comparisons", by Øyvind Skreiberg of the Norwegian Institute of Technology, Institute of Thermal Energy and Hydro Power, disclosed at Comett Expert Workshop, "Biomass Combustion", May 1994) discloses that catalytic converters, however, can lead to an increase in $NO_X$ emissions. One further disadvantage of catalytic converters is that they are a consumable device—the coating that acts as the catalyst wears off with use.

Skreibeg also defines that staged combustion comprises: the separation of the gasification chamber (referred to hereinafter as the primary combustion zone, PCZ) and the additional combustion chambers (referred to hereinafter as secondary combustion zones, SCZ's); the use of downdraft combustion (referred to hereinafter as secondary combustion) to ensure good mixing of air and combustible fuel emissions; and good insulation of the combustion chambers as well as some preheating of the combustion air, both of which ensure a high combustion temperature. Gasification is the thermo-chemical process of converting the solid fuel into gaseous products such as oil, tar and other heavy combustible gases and occurs as the solid fuel heats up, breaks down and combusts. Downdraft combustion is created using secondary air sources which create turbulent air within the SCZ. It is well known in the art that SC occurs more readily in a turbulent air environment since turbulence lends itself to better mixing of oxygen and heavy particulates (emissions) and thereby promotes SC. It is also known in the art that the use of successive secondary combustion Zones leads to greater efficiency.

P.C.T. Pat. No. WO 85/03762 ('762) to Danielsson discloses a combustion apparatus that uses multiple air supply ducts to horizontally inject air into the combustion chamber, leading to turbulence and thereby facilitating more complete combustion. Importantly, '762 discloses an apparatus that uses a plurality of combustion zones. However, through experimentation, it has been found that horizontally fed air is not the most efficient way of establishing a turbulent air environment. Further, in the '762 disclosure, not all zones are used for combustion: only zones one, two and three combust the fuel. The fourth zone does not combust any fuel. The '762 patent uses similar concepts of creating a turbulent air environment to improve combustion. The '762 patent also suffers from the disadvantage of requiring a calibration procedure to adjust the flow of the secondary air supply ducts at the time of installation. This is impractical because each fuel source (i.e. different types of wood or coal) combusts differently, so the apparatus of '762 requires calibration every time a different fuel is used.

U.S. Pat. No. 4,658,801 ('801) to Black discloses a stove comprising three sequential combustion chambers and a top-down window air wash. Patent '801 also discloses the use of stainless steel for the purpose of reflecting heat to maintain heat at its catalytic converter. It is important to note that this is the extent of the stainless steel's use. Patent '801 relies on a catalytic converter between the second and third combustion chambers for complete combustion of the fuel; the disadvantage of this has been discussed above. Further, in practice, the top-down air (counter-acting airflows) results in a build up of combustion products at the bottom of the window, thereby requiring the user to constantly clean the window and thereby defeating the purpose of the air wash.

U.S. Pat. No. 5,341,794 ('794) to Henry et al. discloses the use of SCZs, the use of multiple self-induced air sources, and the use of a top-down air wash. The air supplies create a turbulent air environment and purportedly establish three SCZs; however, because of the close proximity of the air supplies, the disclosed three SCZs actually form one SCZ. Also, as explained hereinabove, the use of a top-down air wash does not work well in practice.

U.S. Pat. No. 4,319,556 ('556) to Schwartz et al. discloses a combustion apparatus with two combustion zones and discloses the use of injected secondary air. Secondary combustion is indeed achieved; however, it is achieved through the use of a catalytic converter. The disadvantage of using a catalytic converter has been discussed hereinabove.

Prior art solid fuel combustion apparatus employ gravity-fed, natural draft chimney systems of at least 4.3 m (14') of vertical height in order to create the necessary draw or pressure differential to remove exhaust gasses and the products of combustion. This vertical height restriction severely limits the type of building in which solid fuel apparatus may be used due to space and design constraints.

The above disclosures teach similar approaches to generating secondary combustion. The above disclosures either employ secondary combustion by using turbulent air in particular regions of the firebox, or they achieve secondary combustion by using a catalytic converter. There is need, however, for a secondary combustion apparatus that has been designed to optimally burn all types of solid fuel products without relying on a consumable, catalytic converter to reduce emissions and increase efficiency. Further, there is need for a window air wash that keeps the viewing window clean in practice. There is also a need for a self-regulating and self-adjusting secondary combustion apparatus. There is also a need for a clean burning secondary combustion apparatus for solid fuel which incorporates the visually appealing floating flame esthetics whereby the flames appear to float or dance above rather than on the fuel. There is also need for a secondary combustion apparatus that is adapted to burn any solid fuel, including cord wood, wood pellets, or coal. Finally, there is a need for direct vent combustion apparatus that creates its own pressure differential, obviating the need for relatively lengthy chimneys, thereby permitting relatively short and alternatively routed chimney structures for use, for instance, in high density housing.

BRIEF SUMMARY OF THE INVENTION

It is an object of the present invention to implement a secondary combustion apparatus for solid fuel that overcomes some of the disadvantages of the prior art.

Other objects of the present invention include providing a combustion apparatus with a firebox, an opening to enable loading of a solid fuel, a primary air inlet for delivering primary combustion air into the firebox, at least one secondary air inlet for delivering secondary air into the combustion apparatus and at least one planar baffle with a leading free edge delineating one side of an opening to a vent structure adapted to receive exhaust gasses and particles of combustion spanning the distance between said side walls of the apparatus and dividing a primary combustion zone in the firebox from a secondary combustion pathway;

Another object of the invention is to provide a secondary air inlet located across a forward edge of the base of the apparatus adjacent to said front wall to direct the secondary air vertically along the front wall, thereby acting as or creating a secondary combustion zone, a wash across the front wall and some supply of air to the primary combustion zone, such that the resulting flame at said secondary combustion zone appears to float above the fuel. The secondary air inlet may be a transverse row of vertical holes. Advantageously, the secondary combustion pathway may include at least one baffle forming directing said exhaust in at least one direction change. A preheating chamber may surround the firebox. The secondary combustion pathway may be a winding passage with a plurality of secondary combustion zones. There may be an intake manifold in the back wall of the preheating chamber, which gradually narrows and may include a plurality of ducts.

The combustion apparatus may include a lower baffle, mid baffle, upper baffle and a top baffle. Advantageously, the lower baffle may be disposed at an angle of 10-30 degrees above the horizontal, the mid baffle disposed parallel to the lower baffle, and the upper baffle disposed at an acute angle between horizontal and vertical towards the front wall of the firebox. The top baffle may extend from the top edge of the rear wall at an angle between 20 and 75 degrees. The baffles may include secondary air inlets, optionally at each change of direction in the secondary combustion pathway. The baffles may also include a plurality of zig-zagged ribs. Slots may also be disposed at oblique angles in the baffles to create air turbulence.

Another object of the invention is to provide a method of combusting fuel whereby primary air is introduced into a stove, the fuel is ignited, then an additional air source is introduced and the exhaust from combustion is removed via a secondary combustion pathway adapted to support ongoing combustion and where secondary air is introduced, particularly at turns in the secondary combustion pathway, such that the temperature of the combustion is higher at each successive secondary combustion zone.

Further advantageously, the additional air washes upwards over a glass door, cleaning the glass and providing primary and secondary air for combustion. A catalytic reaction may be initiated furthest downstream, preferably in the SCZ, to further reduce emissions. The exhaust may be vented via a stack including a coaxial sheath, where the stack projects from the rear of the stove at an angle greater than 10 degrees above the horizontal.

Finally, rear and top direct vented variations of the combustion apparatus are provided whereby at least two coaxially mounted stove pipes are provided to vent exhaust via an inner pipe and provide air from outside a building envelope via an outer pipe, thereby permitting relatively short and alternatively routed venting structures.

BRIEF DESCRIPTION OF THE DRAWINGS

FIG. 6 is a detail view of the air outlets and ribbing according to the invention.

FIG. 7 is a right elevation view of the mid baffle according to the invention.

FIG. 8 is a perspective view of the upper baffle according to the preferred embodiment of the invention.

FIG. 9 is a plan view of the top of the combustion apparatus according to the invention.

FIG. 10 is a left elevation of a centre-line cross-section of the combustion apparatus including a schematic representation of the flow pathway of combustion gases in the combustion apparatus according to the invention.

FIG. 11 is a left elevation of a centre-line cross-section of the top-vented, direct vent version of the combustion apparatus according to the invention.

DETAILED DESCRIPTION AND THE PREFERRED EMBODIMENT

Figure 1:
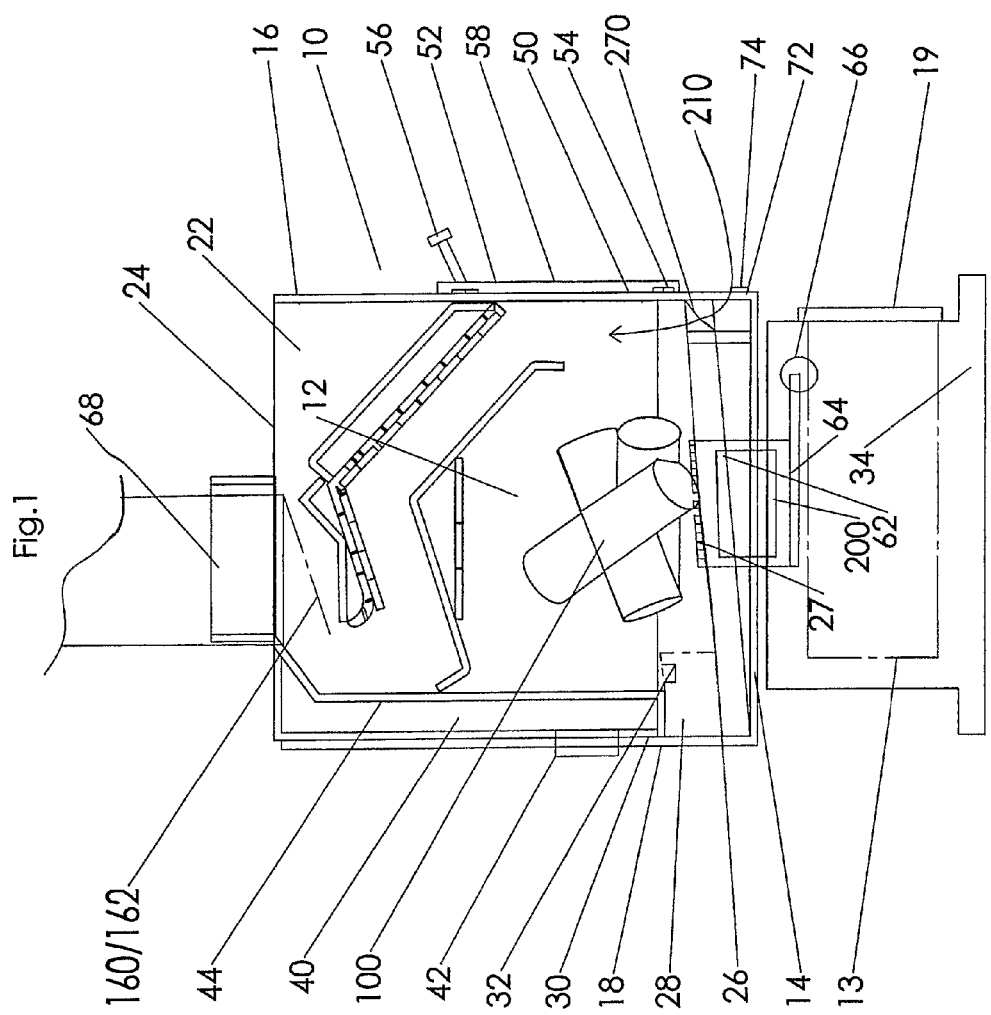
FIG. 1 is a cut-away left side view of the preferred embodiment of the combustion apparatus according to the invention.

Referring to FIG. 1, the preferred embodiment of the invention, a natural draft secondary combustion apparatus 10 is shown in perspective. The combustion apparatus 10 includes a firebox 12, which is generally cube or box shaped and comprised of six planar panels, each having four edges contiguous with the edges of four other panels. The panels, specifically a bottom 14, front wall 16, back wall 18, left wall 20, right wall 22 and top wall 24 form the firebox 12. The front wall 16, left wall 20, right wall 22 and back wall 18 extend vertically from the bottom 14 and are capped by the top wall 24. The left wall 20 and right wall 22 extend between the front wall 16 and back wall 18. The firebox 12 is supported by a pedestal/base 34. The pedestal/base 34 has a front opening door 19 provides access to an ash drawer 13. The firebox 12 preferably has a 127 mm (5") round flue exit collar 68 situated in the back half region of top wall 24. The flue collar 68 may also be 152 mm or 6" in diameter, or other sizes depending on the scale of the combustion apparatus 10. The firebox 12 could be provided in other shapes such as the appropriately curved firebox 12 of a potbellied stove.

An outer jacket 30 defines a preheating chamber 40. The outer jacket 30 is comprised of a left panel 36, right panel 38 and inner back 44. The left panel 36, right panel 38 and back 44 of the outer jacket 30 are generally of the same size and parallel to the left wall 20, right wall 22 and back wall 18 of the firebox 12. The bottom edge of the outer jacket 30 seats against the top of firebricks 28 located in the bottom region of the firebox 12, and is held in place by a series of continuous flanges 32 projecting at substantially 90 degrees between the lower region of the left wall 20, right wall 22 and back wall 18 of the firebox 12 and the outer jacket 30. In the preferred embodiment, the outer jacket 30 is separated and gasketed from the firebox 12 walls by a distance of, preferably, 25-76 mm (1-3"). The outer jacket 30 may be 6-24 mm (0.24-0.9") from the firebox 12, depending upon the size of the appliance.

In the preferred embodiment, the components of the firebox 12 are formed of 6 mm (¼") thick abrasive resistant (AR) steel and the left panel 36, right panel 38 and back panel 44 of the outer jacket are preferably comprised of 6 mm (¼") thick 304-2B stainless steel.

The back side of the outer jacket 30 includes an intake manifold 42 to allow the ingress of secondary combustion air into the preheating chamber 40. The preheating chamber 40 is thereby defined by the outer jacket 30, flanges 32, and back wall 18, left wall 20, right wall 22 and top wall 24. The intake manifold 42 is preferably rectangular, and is advantageously 152 mm (6") in length and 76 mm (3") in height. The intake manifold 42 may be between 102 mm w×51 mm h and 203 mm w×102 mm h (4"w×2"h and 8"w×4"h) in height and width respectively, depending upon the size of the appliance.

Front wall 16 includes an front opening 50 to enable loading of fuel 100 into the firebox 12. A door 52 is mounted at either the left or right edge of the opening by at least two hinges 54, and is held closed by latch assembly 56. The door 52 includes a glass viewing window 58. The glass window 58 is preferably ceramic glass that can withstand temperatures of approximately 927.degree. C. (1700.degree. F.) and will allow the transfer of radiant heat to leave the firebox 12 in the form of radiant heat waves (infrared radiation).

A planar, inclined hearth 26 sits atop the bottom wall 14 and is inclined such that the rear edge of hearth 26 is advantageously 51-102 mm (2-4") lower than the front edge, although it may be on any angle between 5 and 10 degrees. The front edge of the hearth 26 is, therefore, sloped up towards the viewing window 58, and facilitates front to back fuel loading of the fuel 100.

A fire brick lining 28 lines the inside of the firebox 12, partially covering the right wall 22, left wall 20 and back walls 18 of the firebox 12. The lining extends from the intersection of the hearth 26 and the right wall 22, left wall 20 and back walls 18, advantageously to the bottom one-third the height of the walls. Lining 28 insulates the metal walls of the firebox 12 and helps to maintain/contain the heat from the primary fire/fuel load 100 in the firebox 12. Any commercially available small, slotted cast iron fire grate 27 may support the fuel 100. In order to promote proper combustion of coal, for example, cast iron "shaker" grates are also incorporated into the hearth 26 of the appliance to ensure the proper amount of bottom-fed air that coal needs for combustion plus these allow for the periodic agitation of the coal bed to remove excess ash from the firebox 12 to fall down into ash drawer 13 for disposal.

The bottom wall 14 and inclined hearth 26 include a parallel rectangular opening 62 to allow access of initial air 200. Opening 62 is preferably 104 cm$^2$ (16 inches$^2$), but may be between 58 cm$^2$ and 232 cm$^2$ (9 and 36 inches$^2$), depending upon the size of the appliance. Bottom damper 64, advantageously a flapper door, is controlled by damper knob control 66. In the preferred embodiment, a commercially available bi-metal strip is used to automatically open or close the flapper door 64 based on the temperature that the bi-metal strip is exposed to.

The base of front wall 16 includes an angled surface with a plurality of air holes 270 adapted to permit entry of a unique and additional second air source 210 to firebox 12. A front damper 72 controls access of the second air source 210. In the preferred embodiment, the front damper control 74 is a simple sliding lever. Incoming second air source 210 is room air at ambient room temperature.

Figure 2:
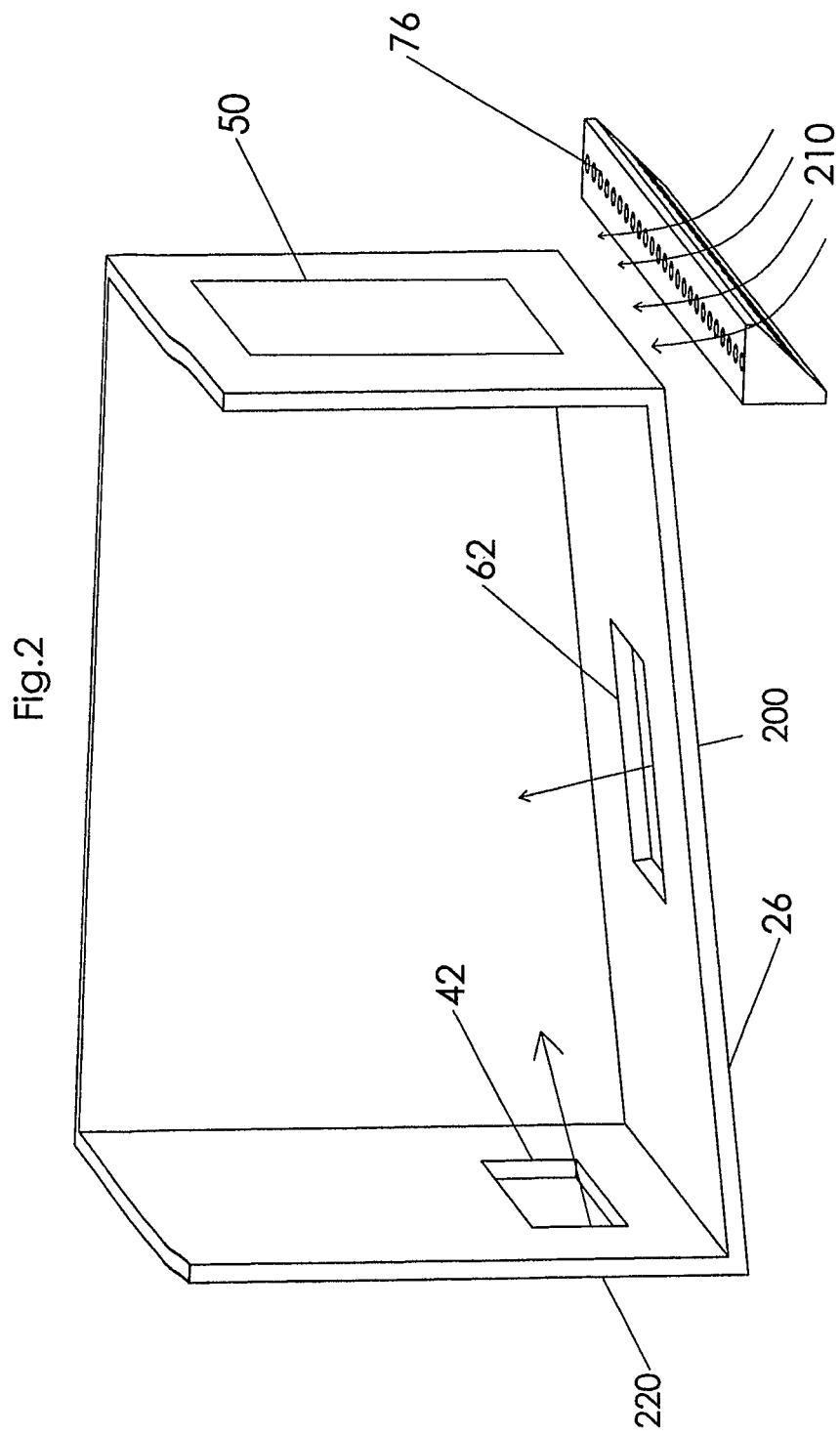
FIG. 2 is a cut-away exploded perspective view of the air supply means to the firebox according to the invention.

Referring now to FIG. 2, a cut-away perspective view of the air supply means to the firebox 12 is shown. Inlets for three separate air sources are provided. Specifically, primary inlet 62 for initial air 200; second air inlets 76 for the unique second air 210; and intake manifold 42 for preheated air 220. It will be seen that the preheated air 220 also feed a series of ducts (not shown here) to support the series of secondary combustion zones (SCZs).

Figure 3:
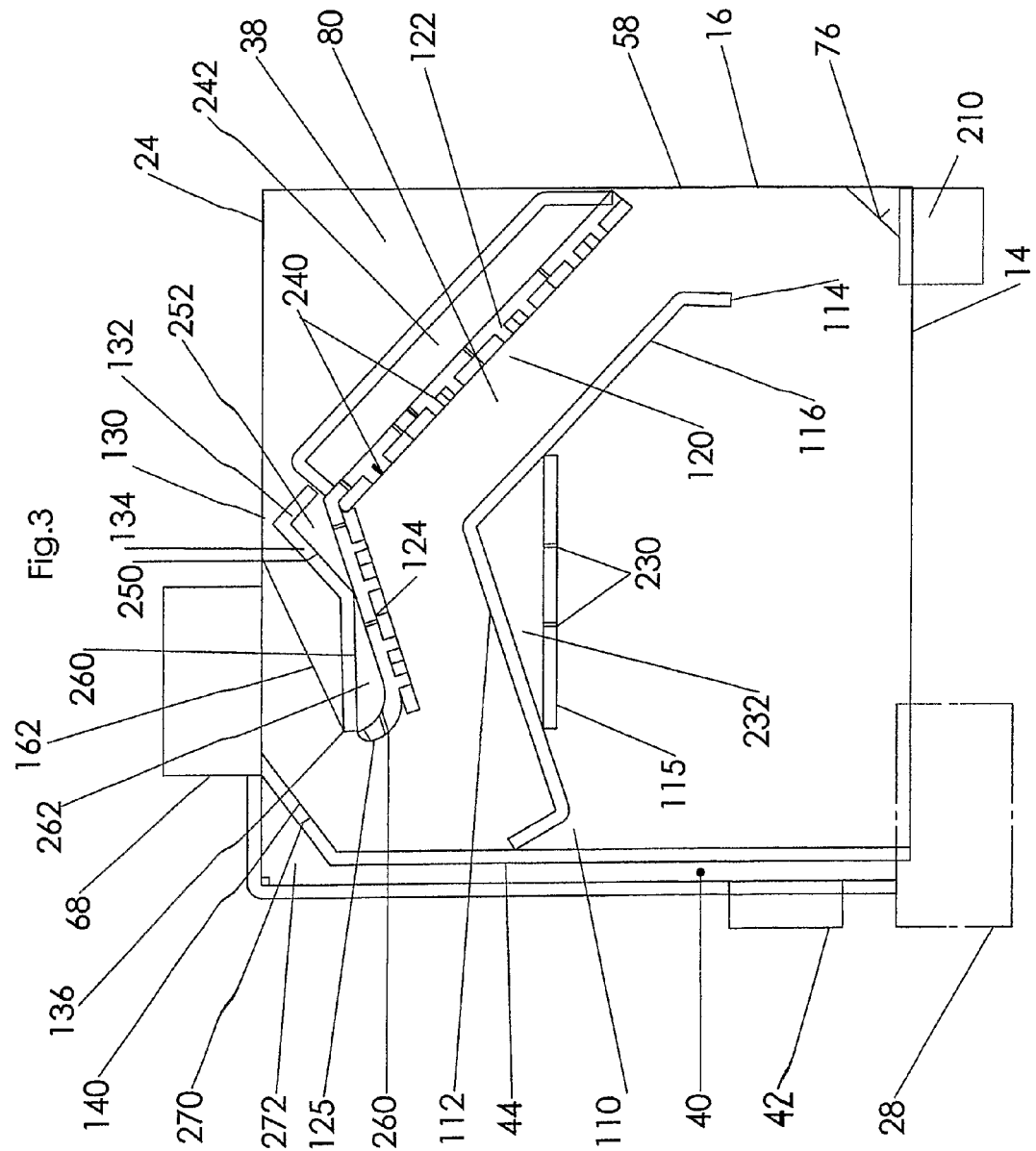
FIG. 3 is a left elevation view of a centre line cross-section of the upper portion of the combustion apparatus according to the invention.

Referring now to FIG. 3, a left elevation view of a centre line cross-section of the upper portion of the combustion apparatus 10 is shown. A secondary combustion pathway 80 is defined by lower baffle 110, mid baffle 120, upper baffle 130, top baffle 140, back panel 44, left panel 36 and right panel 38. In the preferred embodiment, the baffles are comprised of generally rectangular planar 6 mm (¼") thick 304-2B stainless steel sections extending horizontally to the left panel 36 and the right panel 38. Other heat resistant material such as porcelainized, rigid ceramics or Robax™ Neo-Ceram™ glass coated on one side with a heat resistant reflective coating may be used. Other commercially available materials such as high density vermiculite, perlite, and calcium silicate may also be used. Some leading and trailing edges and joins between the individual sections are rounded to promote laminar flow through the secondary combustion pathway 80 (see below for details).

The lower baffle 110 is located in the upper region of the lower firebox 12 and divides the firebox 12 into upper (SCZs) and lower (PCZ) compartments. Lower baffle 110 is preferably positioned such that the leading edge of the lower baffle 110 is approximately one half the height of the front wall 16. Lower baffle 110 is comprised of generally rectangular planar baffle sections 112, 114, 115 and 116. The rear edge of baffle section 112 abuts the back wall 44 of the preheating chamber 40 at a height of approximately 305 mm (12") above the bottom 14, but may be between 254 mm-406 mm (10-16"), depending upon the size of the appliance. With scaled up industrial size appliances the relative scale should be preserved. The baffle section 112 is inclined (inverted "L" shaped), leading from the back panel 44 down, then upwards and towards the front wall 16 to the center of the firebox 12 at an angle of 20 degrees above horizontal to the mid point of baffle 110 ideally, baffle section 112 is disposed at between preferably 10-20 degrees above the horizontal. Baffle section 116 may be inclined from the front wall 16 at an angle of between 45 and 70 degrees above horizontal to meet baffle section 112 at the midpoint of baffle 110. The front baffle section 114 is essentially an extension of baffle section 116, formed with a preferably 38 mm (1.5") radius bend (which creates "lift") downwards and vertically towards the bottom wall 14, parallel to the front wall 16. In the preferred embodiment, the leading edge of baffle section 114 is located 50 min (2") behind front wall 16, therefore leaving a space for the combustion pathway 80. The distance between the leading edge of baffle 110 and front wall 16 may be between 50 mm and 100 mm (2" and 4"), depending upon the size of the appliance. A generally horizontal, planar baffle section 115 is positioned beneath the intersection of sections 112 and 116 and abutting both of them and the left panel 36 and right panel 38 at its side edges, thereby creating an air duct 232. The elongated, generally triangular prism shaped first air duct 232 is defined by baffle sections 112, 115 and 116, and has open ends. The ends of the air duct 232 are open to the preheating chamber 40.

Figure 4:
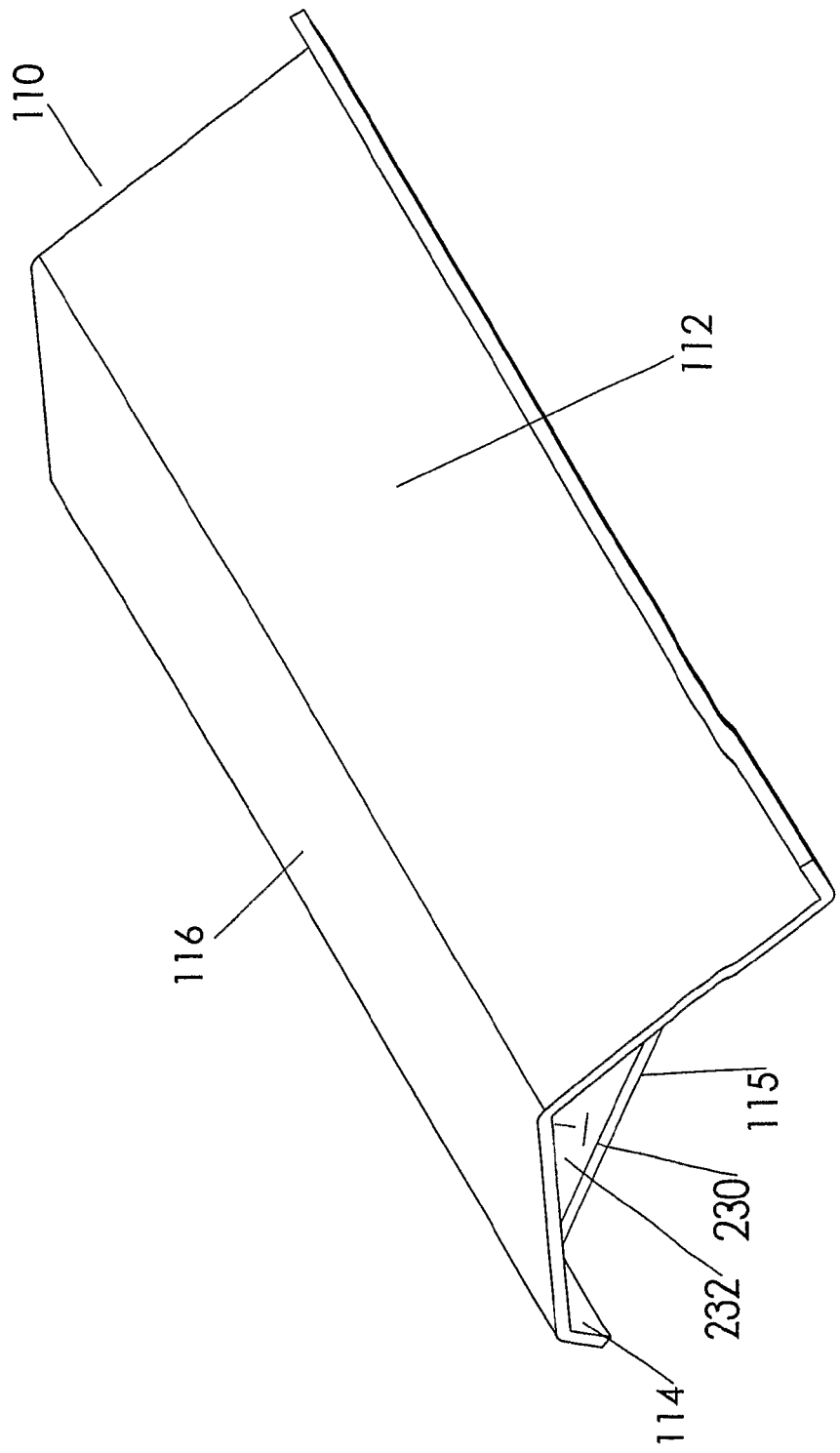
FIG. 4 is a right perspective detail view of the lower baffle of the combustion apparatus according to the invention.

Referring now to FIG. 4, a right perspective detail view of the lower baffle 110 and components rear section 112, vertical section 114, mid section 115, front section 116, and an air duct 232, is shown.

Figure 5:
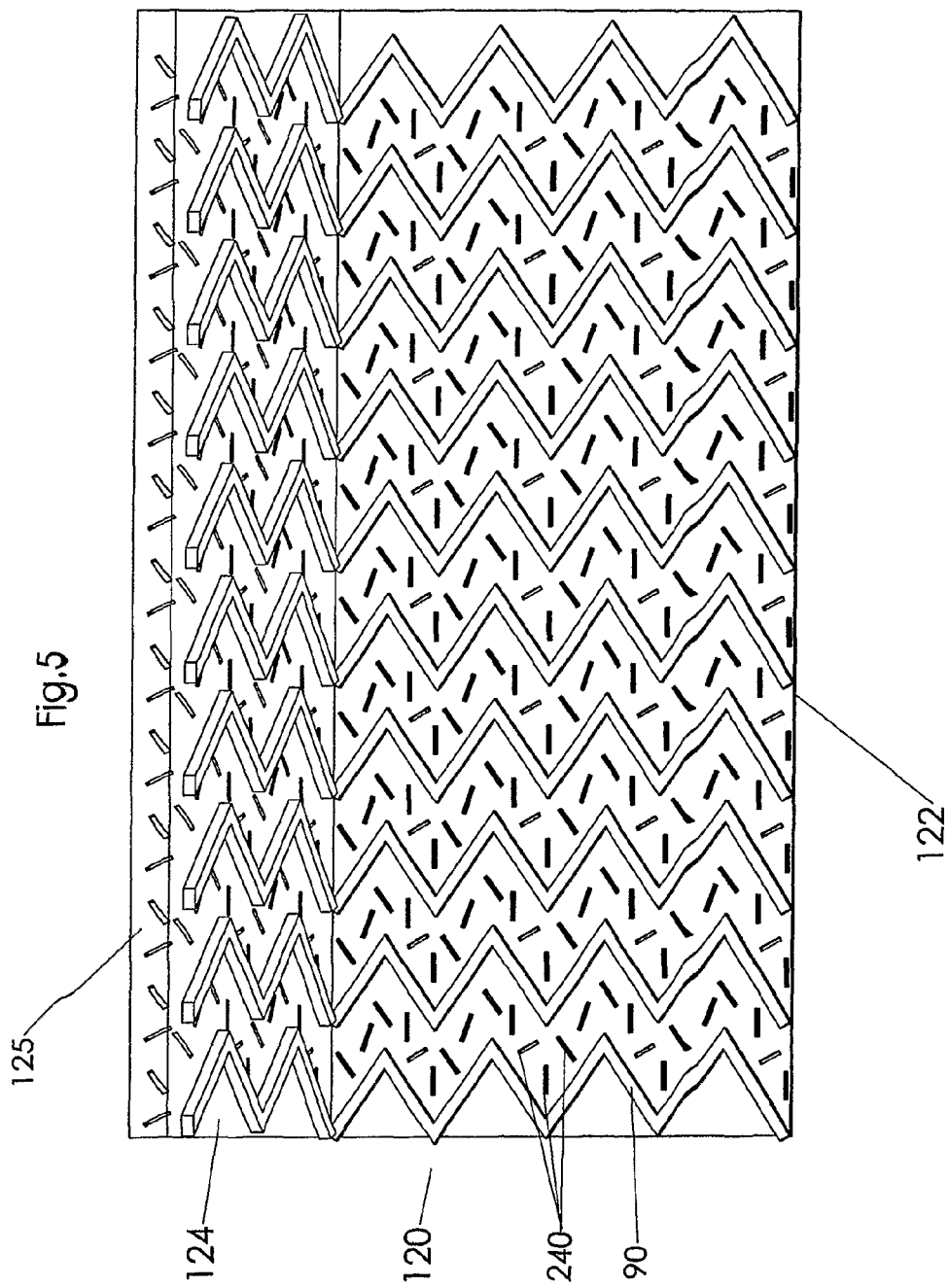
FIG. 5 is a plan, bottom view of the mid baffle of the combustion apparatus according to the invention.

Referring now to FIG. 5, a plan, bottom view of the mid baffle 120 is shown. The mid baffle 120 is located above lower baffle 110, and below top wall 24. Mid baffle 120 is comprised of generally rectangular planar sections including a front section 122, a rear section 124 and a curved rear section 125. The curved rear section 125 of mid baffle 120 is preferably formed by a 38 mm (1.5") radius bend upwards. Referring now to both FIGS. 3 and 5, in the preferred embodiment, front section 122 is substantially parallel to the front section 116 of the lower baffle 110 and the sections are separated by an optimal distance of 50 mm (2") although this distance may be varied, particularly in apparatus for industrial or other applications. This 50 mm (2") separation defines the secondary combustion pathway 80. Rear section 124 is substantially parallel to rear section 112 of the lower baffle 110 and the sections are separated by a distance of 50 mm (2") in the preferred embodiment. The distance between the front section 122 and the rear section 124 and front section 116 and rear section 112 may be varied so that front section 122 and rear section 124 are convergent with front section 116 and rear section 112. The top edge of section 125 is attached to the rear edge of section 136 of the upper baffle 130. In the preferred embodiment, curved rear section 125 projects upwards at approximately 80 degrees above horizontal. Mid baffle 120 is, therefore, inclined and extends upwards from the front wall 16 towards the centre of the firebox 12, then declines towards the rear wall 44. The rear edge of baffle 120 ends approximately 50 mm (2") from the back wall 44 in the preferred embodiment, thereby leaving a space for the secondary combustion pathway 80. Front section 122 abuts and is gasketed to the front wall 16, and abuts the left panel 36 and right panel 38 along its left and right edges. Sitting atop of baffle section 122 is a generally triangular prism shaped second air duct 242. The air duct 242 is open on the ends to the preheating chamber 40. Air outlets 240 direct the super-turbulent secondary air flow towards lower baffle 110 sections 112/116.

Referring now to FIGS. 5 and 6, a detail view of air outlets and ribbing is shown. Zig-zagged, metal ribbing 90 is disposed upon the bottom surfaces of mid baffle sections 122/124, preferably at 50 mm (2") intervals. The ribbing 90 increases the turbulence of the combustible flue gases rising from the firebox 12, agitating the gases in order to better mix with the incoming super-turbulent secondary air from the air outlets 240. Front section 122 represents another novel and unique design of the combustion apparatus 10. In practice, prior art designs have struggled to handle excessive heavy combustible gases, oils, tars and particulates resulting in dirty viewing window surfaces, high emissions evident by smoke billowing from the chimney and lower combustion efficiencies. Starting with secondary air outlets 230 (see FIG. 3), then with air outlets 76, and next to air outlets 240, the combustion apparatus 10 of the present invention literally extracts the heavy combustible products from the fuel load 100 and burns them up virtually completely.

Referring now to FIG. 7, a right elevation view of the mid baffle is shown, including curved rear section 125, rear section 124, and front section 122 and secondary air duct 242.

Referring again to FIG. 3 and to FIG. 8, the upper baffle 130 is shown, which is comprised of generally rectangular planar front section 132, mid section 134 and rear section 136. The position of front section 132 is not critical but it may extend at an angle between 0 and 90 degrees below horizontal from the front wall 16. In the preferred embodiment, front section 132 extends backwards at approximately 45 degrees above horizontal in relation to the front wall 16. Mid section 134 extends at approximately 45 degrees below horizontal from the front wall 16. Rear section 124 of mid baffle 120 preferably abuts mid section 134. In the preferred embodiment, mid section 134 extends at approximately 45 degrees below horizontal from the front wall 16. Rear section 136 of upper baffle 130 preferably extends upwards towards the back panel 44 at an angle between 0 and 10 degrees below horizontal towards the back panel 44. In the preferred embodiment, section 136 is 10 degrees above horizontal. The rear edge of rear section 136 is attached to the top edge of curved section 125 of the mid baffle 120. Mid section 134 extends substantially perpendicular to both front section 132 and of mid baffle 120, until it abuts to the upper surface of mid baffle 120, section 124, thereby forming a triangular prism shaped third air duct 252. Third air duct 252 has open ends abutting the preheating chamber 40. Rear section 136, rear section 124 and curved section 125 define a fourth air duct 262, which also has open ends to the preheating chamber 40 and is generally a triangular prism.

Top baffle 140 extends forwards from the back panel 44 at an angle of approximately 45 degrees (optionally 20-45 degrees) to the top wall 24, thereby forming a fifth air duct 272, which also has open ends to the preheating chamber 40 and is generally a triangular prism. In the preferred embodiment, the top baffle 140 is separated from rear section 136 by 50 mm (2").

The secondary combustion pathway 80 formed by the lower baffle 110, mid baffle 120, upper baffle 130 and top baffle 140 have been optimally designed according and tested to maximize the length of the path 80 and create the most turbulence, while maintaining effective, accelerated flow and combustion of the flue gases. In the preferred embodiment the baffles are 6 mm (¼") thick 304-2B stainless steel which has high thermal durability and relatively low heat conductivity, compared to mild or abrasive resistant steel. The low heat conductivity is necessary to maintain continuous high temperatures in the secondary combustion pathway 80. The extended secondary combustion pathway 80, is a meandering, serpentine pathway resembling an upright "squiggle". The beginning of the pathway 80 is larger in volume than the upper end. This design using baffles to shape and maintain optimum airflow is unique, and allows for the secondary combustion apparatus to be self-sustaining and self-regulating like an engine. As long as fuel is supplied to the firebox 12 and subsequently gasifies, the SCZs self regulate air supply and run unchecked.

The baffles include secondary air outlets 230, 240, 250, 260 and 270 formed in a linear, herringbone pattern of slits to create maximum air turbulence at the air injection points. The air outlets are aligned at oblique angles to each other such that maximal mixing of oxygen and combustible flue gases will occur as secondary air is drawn out and "twirls" into the combustion pathway 80. As less secondary air is required at the top of the combustion pathway 80 than at the bottom, the size and quantity of the exit apertures in the secondary air sources is progressively reduced downstream throughout the secondary combustion pathway 80 so that more air enters through secondary air outlets 230 and 240 than through secondary air outlets 250, 260 and 270, thereby decreasing the port loading at the upper secondary air outlets. It is desirable to maximize the volume of secondary combustion at the lower end of the meandering combustion pathway 80 to break down the heaviest combustible products encountered first. In the preferred embodiment, the actual size of the slits/ports is 28 mm (1/16") wide. Preferably secondary air outlets 230 and 240 have slits 12 mm (1/2") long, and secondary air outlets 250, 260 and 270 have slits that are 7 mm (1/4") long.

Unique, second air outlets 76 are located at the intersection of bottom wall 14 and front wall 16 along the bottom edge of the viewing window 58. Secondary air outlets 230 are located in the lower baffle 110 mid section 115. The herringbone patterned air outlets 240 are abundantly located in baffle front section 122 (see FIG. 5) in a zig-zag pattern. Air outlets 250 are located in the upper baffle 130 sections 134/136. Air outlets 260 are located in the rear section 136. Air outlets 270 are located in the upper baffle 140.

Referring now to FIG. 9, a plan view of the top of the combustion apparatus 10 is shown. In this cut-away plan view, the top wall 24 has been removed to show the upper baffle sections 134 and 136, left funnel section 160 and right funnel section 162, and an exit collar 68 which describes a hole in the top wall 24 through which all gases exit the firebox 12 into the chimney 300. Left funnel section 160 and right funnel section 162 are joined to mid section 134 and rear section 136 and are gasketed to top wall 24 and attached to left panel 36, and right panel 38 and serve to funnel the flue gases to the flue outlet.

A commercially available thermometer 155 is installed near the exit collar 68 to allow the user to monitor the temperature at the top of the secondary combustion pathway 80.

Referring now to primarily FIG. 1, FIG. 3 and FIG. 10, the preferred embodiment in operation is described.

First, fuel 100 is loaded into firebox 12, from front to back. The inclined hearth 26 facilitates the front to back loading. Next, bottom damper 64 is opened using damper control 66, permitting a large volume of the initial air source 200 to enter the firebox 12 through the primary inlet 62. Next, fuel 100 is ignited using an ignition means such as a match or a lighter, paper and kindling. The ignited fire is then allowed to combust as it would in a conventional combustion apparatus. The convection current 170 (see FIG. 10) at the initial stage will rotate from the PCZ 180 towards the back panel 44, then upwards towards lower baffle 110. Lower baffle 110 redirects the convection current 170 in two directions: (1) rolling and trapping some flow backwards towards the back panel 44; and (2) directing some towards the viewing window 58 wherein the combustible products begin to mix with the second, unique air source 210. At this initial combustion phase, while combustible gases are entering the secondary combustion pathway 80 only some limited secondary combustion is taking place. Combustion is taking place primarily in the PCZ 180 in the lower portion of the firebox 12 in a conventional manner.

Conventional, primary combustion, of the solid fuel 100 continues. In the preferred embodiment, it only takes approximately 20-30 minutes of conventional, primary combustion to sufficiently heat up the extended, combustion pathway 80 in order to support secondary combustion. This is observed at temperatures reaching approximately 900° F. at the SCZ 6 284 near the flue collar 68 as seen on the thermometer 155. This "start-up" phase is much shorter than the prior art designs, thereby reducing the initial smoking seen during light up or initial combustion phase on any solid fuel burning appliance. This is achieved by the addition of initial air 200 as it "whips" the fire up and causes the combustion apparatus 10 to reaches its optimal operating temperature quickly. Because this initial air 200 is entering the firebox 12 with such a high velocity it creates enough "pull" (pressure differential) through the secondary combustion pathway 80 that some secondary air begins to exit from the air apertures in every SCZ, resulting in a limited amount of secondary combustion. Again, this starts much sooner than prior art designs as evident by the amount of "start-up" smoke exiting the chimney. At this time or at initial light up, front damper 72 is opened using front damper control 74 and the unique, second air source 210 enters the firebox 12 just below the viewing window 58 and washes upwards to the front top of the firebox 12 and into the combustion pathway 80. During start-up, the introduction of the unique, second air source 210 has the effect of both creating a protective airflow across the window surface in the same direction as convection current 170 and it causes the convection current 170 to be "drawn" up and out of the firebox 12, entering the combustion pathway 80. At this point some secondary combustion air (observable as flame) can be seen coming out of lower baffle mid section 115, also from the unique air outlets 76 under the window 58, seen as the 'floating flame'. This 'floating flame' is a unique aspect of the combustion apparatus 10. During testing, flame was observed in SCZ 6 284 through a small observation hole drilled into the flue collar 68. Therefore, at this point, secondary combustion has already started, even though the combustion apparatus 10 is still in its "start-up" phase.

Once the optimal operating temperature of approximately 482° C. (900° F.) is reached at SCZ 6 284, the combustion apparatus automatically shifts into its optimal combustion phase where secondary combustion occurs along the elongated, extended, serpentine secondary combustion pathway 80 in successively hotter combustion zones, achieving virtually complete combustion and optimal thermal heat transfer. This happens automatically as the bottom flapper door 64 begins to close off the initial air 200 by means of the bi-metal damper control 66 as is known in the art. When this happens, the pressure differential in the combustion apparatus 10 now begins to draw all its combustion air requirements through the secondary air outlets 230, 76, 240, 260, 270, and 250. Immediately thereafter, the spectacular 'floating flame' dramatically appears from the incoming unique, second air source 210 and fills up the entire viewing window 58, from bottom to top.

The floating flame is achieved as the inclined hearth 26 and front to back fuel loading causing the combustible gases from the fuel 100 to flow upward and forward rushing towards the window 58, thereby mixing with the unique, second air source 210. The unique second air source 210 performs three separate functions: it creates a secondary combustion zone (SCZ 2 214); it creates a continuous and cleaning window 58 air wash; and it provides a small amount of "primary" combustion air supply that continues throughout the burn cycle.

Referring now to FIGS. 3, 9 and 10, pre-heated air 220 is abundantly drawn through the preheating chamber 40 by the vacuum created by the pressure differential between the firebox 12 (low pressure due to combustion) and the outside atmosphere. Most importantly, this vacuum literally "pulls" the combustible gases out of the fuel 100, out of the firebox 12 and in doing so forces the combustible flue gases to pass into the combustion pathway 80 and through a series of zones of turbulent secondary air that are being drawn in through air outlets 230, 76, 240, 260, 270 and 250.

With the addition of secondary air 220, secondary combustion will progress from SCZ1 234 immediately above the fuel 100, through SCZ6 284 before the flue collar 68, and the combustion apparatus 10 transitions to mainly secondary combustion. This transition can be seen for approximately the first 30 minutes as the spectacular yellow/orange floating flame filling the entire viewing window 58. In addition, flame can be seen shooting aggressively out of the air outlets 230 150-202 mm (6-8"), and slightly backwards and down into the fuel load 100. Also, the top wall 24 is extremely hot, evidence of secondary combustion occurring throughout the entire length of the combustion pathway 80.

As the burn cycle progresses the floating flame begins to disappear as the heavy combustible products are combusted and the lighter combustible gases (methane and hydrogen) are now combusted. This change can be seen as the flames shooting out of secondary air sources 230 changing in color to a brilliant blue flame. Further along in the burn cycle these lighter gases will collect just below lower baffle 110 and as enough secondary air is drawn into secondary air sources 230, these gases appear and disappear as a "ghostly" cloud of blue flame, rolling and floating in the firebox 12. This blue flame is identical in appearance to that seen coming off of a burner tube in a natural gas furnace or gas fireplace: one can observe a bright blue, inner mantle surrounded by a darker blue outer mantle of the flame. The combustion apparatus 10 unique and novel design combusts the heavy combustibles first, followed later by the lighter combustible gases. Prior art designs were limited as to trying to combust everything at once in a restricted secondary combustion region situated primarily just above the fuel load 100.

No further adjustment is required; however, front damper 72 can be adjusted slightly or trimmed to improve the combustion at the SCZ2 214, where the floating flame occurs. An excess of air 210 can cause the floating flame to lift off the bottom of the viewing window 58, become unstable and cease to function as a SCZ. Just the correct amount of air 210 results in a stable flame similar to that seen from a burner tube in a gas fireplace, for example.

It is important to note once again that the unique, second air source 210 serves three separate purposes: it fuels some primary combustion, it fuels secondary combustion and it acts as a bottom-up, viewing window air wash. Initially second air source 210 aids primary combustion in Primary Combustion Zone 180 (see FIG. 8) and keeps smoke away from the window surface, but once the optimal burning temperature has been achieved and bottom damper 64 has been closed, it promotes secondary combustion in Secondary Combustion Zone Two, the floating flame. At all times unique, second air source 210 provides an effective window cleaning action, either as a bottom-up air wash or as an actual combustion zone. The morning after test burns the viewing window 58 was covered with a small amount of light brown film that could be wiped off with a dry rag. This is similar to what is found on the windows of wood pellet burning stoves that are achieving combustion efficiencies of 90% or greater.

The exit apertures of air outlets 230 (see FIG. 3) are directed so that air flows substantially towards the bottom wall 14. The mixing of combustible gases from the gasifying fuel 100 and the oxygen from the air outlets 230 promotes secondary combustion and creates Secondary Combustion Zone One. This zone creates more heat. (Secondary Combustion Zone Two, the 'Floating Flame' is Described, in Length, Above) The exit apertures of air outlets 240 are directed so that air flows substantially towards the upper side of lower baffle section 116; the mixing of oxygen and combustible gases creates Secondary Combustion Zone Three. Again, more heat is created. Some of the exit apertures of air outlet 260 are directed so that air flows substantially towards the back wall 44, slightly downward and creates Secondary Combustion Zone Four near the back wall 44. The heat of the gases again increases. The exit apertures of air outlet 270 are directed so that air flows substantially towards upper baffle section 136 and creating Secondary Combustion Zone Five. The exit apertures of air outlet 250 are directed so that air flows substantially towards the flue exit collar 68. Secondary Combustion Zone Six is thereby created. This can be the hottest zone in the combustion system. Temperatures of over 2000° F. are achieved in SCZ 6 284 (as recorded on the thermometer 155).

For some fuels and under varying atmospheric conditions, SCZ 6 284 will exhibit temperatures of under 200° C. (400° F.). The reason for this is due to the varying nature of solid fuel combustion. Each solid fuel has differing rates of bio-mass gasification and differing calorific values. The combustion apparatus 10 is very "forgiving", able to combust any kind of solid fuel with outstanding results.

The Bernoulli Principle (see also Boyle's Law) states that in a fluid, Pressure, Kinetic Energy and Potential Energy add up to a constant value. Or in an equation:

$$P+E_K+E_P=\tau \quad \tau=\text{constant}$$

An increase in fluid velocity leads to an increase in kinetic energy ($E_K$) and to an associated decrease in pressure (P). Conversely, a decrease in pressure (P) will cause an increase in kinetic energy ($E_K$) and an increase in fluid velocity.

Air injection in the secondary combustion zones increases combustion, and therefore, the kinetic energy of the gases. The successive combustion zones SCZ1 234 through SCZ6 284 and the elongated secondary combustion pathway 80 serves to gradually increase the temperature and velocity of the gases within the pathway 80, with a corresponding decrease in pressure (thus the meandering combustion pathway is smaller in volume on the upper end as compared to the lower end). Stainless steel is used in the preferred embodiment to withstand the higher operating temperatures compared to what is found in conventional stoves.

The PCZ 180 (see FIG. 8) has the largest volume, and each successive zone has a smaller volume. After each secondary combustion zone the flue gases must experience a change direction and pass through a wall of secondary air. The amount and direction of this secondary air added at these crucial change of directions has been designed such that optimal mixing of oxygen and gaseous fuel occurs (thermal & fluid dynamics), thereby creating optimal secondary combustion. This causes the flow of gases through the apparatus to speed up and increase in temperature. The products of combustion become hotter, lighter, more buoyant, and therefore, easier to combust further downstream. By creating an extended, elongated secondary combustion pathway 80, secondary combustion occurs over a larger volume, approximately 2 to 3 times greater than prior art designs. Through this process of changing the direction of the flue gases and continually passing the flue gases through a wall of secondary air increases the secondary combustion temperature. It is this increasing intensity of secondary combustion and the increased aggregate volume and speed of secondary combustion that allows the combustion apparatus 10 to achieve its high combustion efficiency and lower emissions.

A high percentage of overall secondary combustion occurs in SCZ 1, 234 (at outlets 230) SCZ2, 214 (at outlets 76) and SCZ3, 244 (at outlets 240). Depending on the fuel load 100 type, the first 3 SCZ's are so effective that in the preferred or "natural draft" version at times the last 3 SCZ's merely acted as a "draft-hood", providing extra, "dilution" air in the stream of flue products, thereby cooling them down substantially. This "draft-hood" net effect is another novel and unique aspect to the design of the combustion apparatus 10, whereby the combustion dynamics are similar to a natural gas burning furnace or gas fireplace, yet while still burning a solid fuel.

Whereas conventional, prior art stoves, in practice, have the hottest point in the primary combustion zone, or just directly above it, followed by a cooling of the flue gases downstream, the combustion apparatus 10 can achieve a continual increase in temperature downstream of the PCZ. As stated, the flue gases can reach temperatures in excess of 1,093° C. (2000° F.) at SCZ6 284. Flue gas analysis revealed that, at times, the combustion apparatus 10 is so effective that by Secondary Combustion Zone Three virtual complete combustion is achieved burning not only seasoned cord wood but bituminous coal. Carbon Monoxide levels were recorded as low as only 800 PPM at various times in the burn cycle, never exceeding 2500 PPM. These levels are approximately 20% of the level that is allowable under the Environmental Protection Agency (EPA) Phase II standard. For instance, the EPA Phase II acceptable levels of carbon monoxide (CO) are allowed to rise to approximately 10,000 PPM as the stove cools down. The combustion apparatus 10 is sufficiently efficient that while combusting fuels such as cord wood and bituminous coal, the EPA Phase II emissions standard for solid fuel combustion are easily satisfied. The EPA fuel load during the official test is manufactured 2×4's and 2×6's. Additionally, $CO_2$ levels and flue temperatures were occasionally recorded low enough to approach the direct vent, natural gas B-Vent standard.

The net effect of these, optimally, six distinct, separate and elongated secondary combustion zones is an extremely clean burning solid fuel combustion apparatus that realizes extremely high BTU outputs, extremely low emissions, evidence of virtual complete combustion, while still maintaining long burn times.

In a variation of the preferred embodiment of the combustion apparatus 10, fuel 100 may be automatically loaded into the firebox 12 using a continuous feed auger system on larger sized commercial or industrial units. A water jacket (not shown) is incorporated at the location of mid baffle 120 to heat up the hot water. A rotating bed or hearth would remove excess ash. Such units would be firing at 1 million British Thermal Units (BTU) and up, suitable for use in greenhouse operations, etc. Presently, there are no commercially available units of this size that could pass Environmental Protection Agency (EPA) Phase II testing for solid fuel emissions standards.

The bottom damper 64 and front damper 72, and the continuous feed auger system may be controlled by a 24 VAC transformer circuit and thermostat.

In a variation of the preferred embodiment, lower baffle 110, mid baffle 120, upper baffle 130 and top baffle 140 consist of porcelainized, rigid ceramic materials or reflective coated ceramic glass. Carbon composite materials may also be used, although due to the current cost of such materials, carbon composite is suitable for very large sized industrial units of approximately 10 million BTU and up. In addition, other commercially available materials now available could include high density vermiculite, perlite or calcium silicate.

The angle and length of the lower baffle 110, mid baffle 120, upper baffle 130 and top baffle 140 may be constructed within the tolerances provided hereinabove thereby providing a combustion apparatus 10 which performs more efficiently than the prior art.

A variation of rear section 124 of mid baffle 120 includes zig-zagged metal ribbing 90 on the underside, as well as the herringbone air outlets 240 in the same zig-zagged pattern.

The preferred combustion apparatus 10 is intended for residential use, with an output of 50-150,000 BTU, and has a combustion volume of 0.03 m³-0.11 m³ (1-4 ft³). A variation, the combustion apparatus 10 may be scaled up in volume for commercial (1 million BTU and up) or industrial (10 million BTU and up) applications. These units include an automated, continuous auger-fed fuel supply and ash removal systems.

In a further variation, the preheating chamber 40 and intake manifold 42 may be adjusted in size, length, shape and location.

In a further variation, the structure of the herringbone secondary air outlets and ribbing 90 may be adjusted and sized to improve turbulence performance. The secondary air outlets may be a plurality of holes inducts consisting of stainless steel tubes.

In a further variation, a small, approximately 76 mm (3") diameter known combustion catalyst 290 (see FIG. 10) may be added to the flue outlet collar 68 to further improve emissions when burning certain grades of coal. The catalyst 290 is preferably located in the SCZ the furthest downstream. The combustion catalyst 290 would further combust $SO_X$, $NO_X$ and $H_2S$ emissions associated with certain grades of coal combustion as regulated in certain jurisdictions.

For example, catalysts are available rated to last at least three years, that are only 1" thick, with a 98% flow through rate and that operate efficiently between only 316° C. and 371° C. (600° F. and 700° F.). It is also known in the art to coat the catalyst 290 with an individually formulated film to contend with different combustion products.

In further variations, the combustion apparatus 10 is provided as either a top-vented, direct vent version or a rear-vented, direct vent version. Prior art solid fuel combustion apparatus employ gravity-fed, natural draft chimney systems. This is due to the fact that the draw or pull or pressure differential in the appliance that brings in primary and secondary air is caused primarily by having the benefit of at least 4.3 vertical metres (14 vertical feet) of chimney (manufacturer recommended) whereby the combusted hot flue gases are rising up the length of the chimney creating the needed pressure differential upstream. The combustion apparatus 10 according to the invention not only creates the required pressure differential by the downstream hot flue gases rising up the chimney system 300 (downstream from the primary/secondary combustion zones) but also creates significant pressure differential through each successive SCZs as the heat and velocity of combustion accelerates through the elongated, meandering pathway 80. The present invention optionally provides extra, "dilution" air in the last three SCZs to increase the velocity of the downstream flue gases if the bulk of the secondary combustion has been realized in the first three SCZs. Adding dilution air also cools the flue gases. This fact works in favor to the combustion apparatus 10 operating in a direct vent environment because with a shorter vent length this would ensure that the vent could not overheat and stall. A further advantage of a co-axial, direct venting configuration attached to the combustion apparatus 10 is that the incoming secondary combustion air 220 will surround and help cool the exiting flue gases which can only be a direct benefit to the safety of the invention.

Referring now to FIG. 11, the top-vented, direct vent ("TVDV") embodiment is shown with a taller firebox 12 than the natural draft preferred embodiment. A co-axial vent 430 optimally consisting of a 152 mm (6") inner stainless steel exhaust liner surrounded by a 254 mm (10") outer stove pipe and extends from the flue outlet 68. The 50 mm (2") air gap between the two vents provides pre-heated air 220, initial air 200 and air to all ducts and outlets. In this version, there are no air outlets 260 in the mid baffle section 125. Secondary combustion air is drawn in to the combustion apparatus 10 from outside the building envelope. The air 220 travels down vent 430 towards the top wall 24 of the appliance and into a cavity or extra cowling 620 surrounding the back half of top wall 24 wall and back wall 18. Cowling 620 is optimally sealed with gasket material (or alternatively is welded) to top wall 24 and back wall 18 thereby isolating the air 220 from any inside room air. Unique second air 210 is still drawn for the floating flame from inside the room through the second air inlets 76. The co-axial vent 430 optimally extends 1.39 m (4 feet) vertically and 1 m (3 feet) horizontally into an exterior 914 mm (36") high "snorkel vent" termination 490. The 1 m (3 foot) horizontal section runs at an angle of approximately 10-20 degrees above horizontal. An insulated wall thimble 470 is installed inside the outer wall to maintain the needed clearance to combustibles.

In addition, baffle 124 includes zig-zagged ribbing 90 dispersed upon the planar, bottom surface with the addition of air apertures 240 also dispersed in the zig-zagged, herringbone pattern, similar to section 122. Top baffle 140 remains the same as the natural draft version (see FIG. 1). Upper baffle 130 is slightly different in shape in the direct vent version. Mid section 134, and rear section 136 are formed in a single planar section projecting towards the top wall 24 from the edge of curved section 125 and are substantially parallel to rear section 124. Air ducts 252 and 262 thereby form a generally rectangular shaped space. A plurality of secondary air outlets 250 and 260 are disposed in the top surface of sections 134 and 136 in increased numbers that seen in the natural draft version (see FIG. 1). Preferably, secondary air apertures 230 of lower baffle section 115 are doubled in quantity.

In the TVDV variation, the bulk of the secondary combustion occurs in the first three SCZ's, and the last three SCZ's self-regulate the air flow, primarily to add extra air which dilutes the flue gases. The final three SCZs also act as standby SCZs in the event that residual secondary combustion is required.

Figure 12:
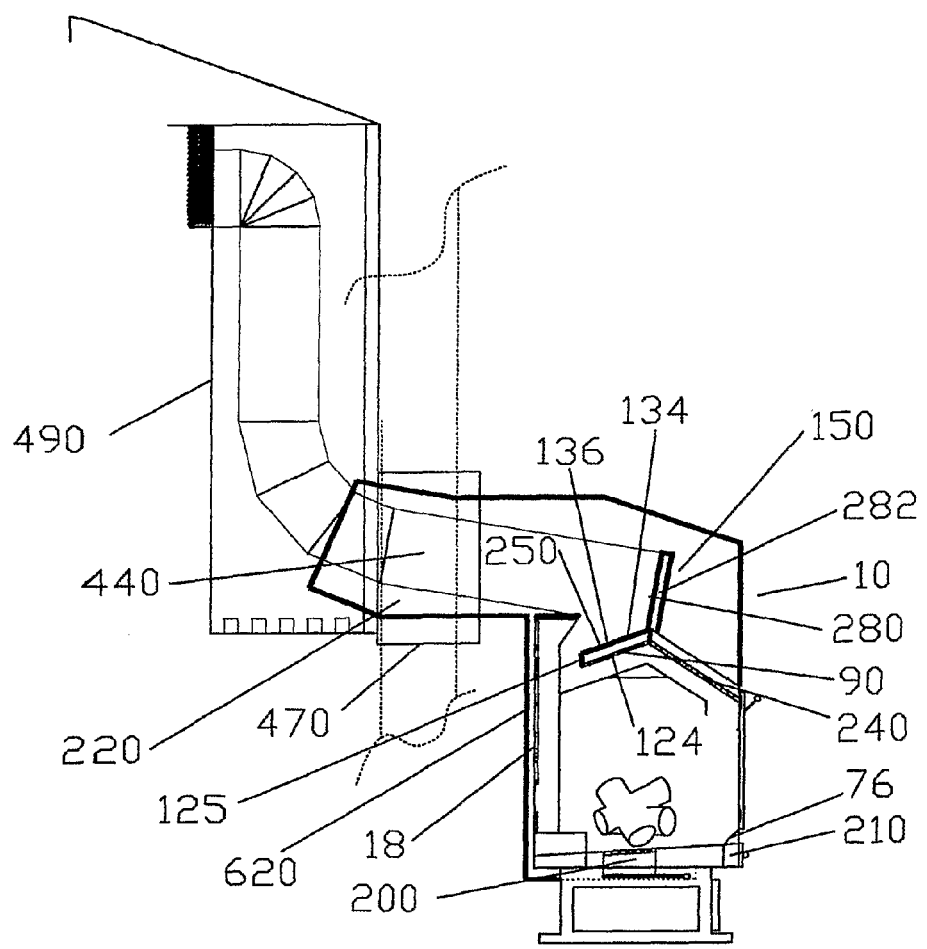
FIG. 12 is a left elevation of a centre-line cross-section of the rear-vented, direct vent version of the combustion apparatus according to the invention.

Now referring to FIG. 12, the rear-vented, direct vent ("RVDV") version of the combustion apparatus 10 is shown also incorporated into a taller firebox 12. The RVDV version, as with the TVDV version, uses a co-axial vent configuration 440 comprising of, optimally, a substantially coaxial 178 mm (7") stainless steel inner exhaust liner surrounded by an 279 mm (11") outer stove pipe. The 50 mm (2") air gap between the two vents provides the pre-heated air 220 to the initial air 200 location and the secondary air ducts. In this version, secondary air outlets 260 are not provided in mid baffle section 125. Secondary air is drawn from outside the building envelope. As is in the TVDV version, the air 220 travels down the vent 440 towards the back wall 18 of the appliance and into a cavity or extra cowling 620—this 620 cowling surrounds and encloses the top wall 24 and back wall 18. The cowling 620 is sealed with gasket material (or is welded) to the back wall 18 and top wall 24 to isolate the air 220 from any inside room air. Unique second air 210 is supplied for the floating flame from inside the room via air outlets 76. Co-axial vent 440 travels directly out of the building from back wall 18 at an approximate angle of 10-20 degrees above horizontal where it preferably is attached to an exterior 914 mm-1219 mm (36"-48") high "snorkel vent" termination 490. An insulated wall thimble 470 is installed inside the outer wall to maintain the needed clearance to combustibles.

In addition, mid baffle rear section 124 includes zig-zagged ribbing 90 dispersed upon the planar, bottom surface with the addition of air apertures 240 also dispersed in the zig-zagged, herringbone pattern, similar to front section 122. Mid section 134 and rear section 136 are formed in a single planar section attached to curved section 125 and are substantially parallel to rear section 124. This defines a generally rectangular shaped secondary air duct 252 and 262 atop rear section 124. A greater number of secondary air outlets 250 and 260 than in the natural draft version are provided in sections 134 and 136. An exit baffle 150 is added to the intersecting, upper surface of the mid point of mid baffle front section 122 and rear section 124 extending, preferably, vertically for approximately 152 mm (6 inches). Attached to the front face of the exit baffle 150 is a generally rectangular shaped secondary air space or air duct 282 open on either side to preheating chamber 40. On the face of exit baffle 150 directed towards the back wall 18 is a plurality of secondary air outlets 280. The additional exit baffle 150 forces air into the rear vent, thereby further facilitating draft. Top baffle 140 remains the same as in the preferred embodiment. Secondary air apertures 230 of lower baffle section 115 are preferably doubled in quantity compared to the preferred embodiment.

In the RVDV version, the bulk of the secondary combustion occurs in the first 3 SCZ's thus allowing the last 3 SCZs to primarily add extra, diluting air into the flue gases. The final 3 SCZs also act as standby SCZs in the vent that residual secondary combustion is required. Due to the restrictive nature of rear-vented, direct vent technology, in general, this version is most applicable for small sized 0.028 m$^3$ (1 ft$^3$) firebox 12 or a medium sized 0.057 m$^3$ (2 ft$^3$) firebox 12.

The direct vent ("DV") combustion apparatus 10 works effectively, including the floating flame (SCZ 2) effect, and the viewing window 58 remains clean during combustion. The secondary combustion through the combustion apparatus 10 creates a draft and acts like an engine. Most of the secondary combustion can occur in the first three SCZs due to the temperature noted at times in SCZ 6 of only 200° C. (400° F. Flue gas and smoke analysis indicates that the DV version of the apparatus 10 burns less effectively than the preferred embodiment. It is, however, a substantial design improvement over the prior art to achieve secondary combustion with less than optimal venting. In the DV version the secondary air sources 230 and 240 are sized and dispersed appropriately (port loading) to ensure that the bulk of the secondary combustion occurs in the first three SCZs. The last three SCZs are also sized and dispersed to ensure that a minimum amount of secondary combustion occurs at these points and that their primary function is to add dilution air into the chimney 300. An additional benefit of the co-axial venting configuration of the DV variations is the ability to balance the flue. The amount of in-coming secondary combustion air is balanced with the amount of the exiting flue gases. A principle of direct vent technology according to the invention is that when the flue has balanced input and output flow, the combustion is more stable. A balanced flue and appropriate port loading in the secondary air outlets of the combustion apparatus 10 allows for direct venting, a significant new technological advancement in solid fuel combustion appliances. The DV technology allows for flexibly customized venting of solid fuel combustion apparatus 10 using a minimum of material, yet while maintaining the increased efficiencies of the present invention.

As will be apparent to those skilled in the art, in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A combustion apparatus for combusting solid fuel, the apparatus comprising:
a firebox defined by a base, a top wall, a front wall, a rear wall and two side walls extending between said base and said top wall, said front wall comprising a window and an opening to enable loading of said solid fuel into said firebox;
a plurality of baffles disposed within said firebox and substantially spanning between said side walls and between said front wall and said rear wall, wherein at least one baffle of said plurality of baffles is disposed between a primary combustion zone and a secondary combustion zone, and wherein said secondary combustion zone is disposed between said primary combustion zone and said window;
a primary air inlet for delivering primary combustion air into said primary combustion zone and a secondary air inlet for delivering secondary combustion air into said secondary combustion zone;
wherein
said secondary air inlet is adapted such that an air flow delivered therethrough is directed upwards adjacent to said window; and
said baffles are dimensioned to direct combustible products from said primary combustion zone towards said front wall, such that said combustible products mix with air from said secondary air inlet within said secondary combustion zone.

2. The apparatus of claim 1 wherein said secondary air inlet is further operable to supply air to said primary combustion zone.

3. The apparatus of claim 2 wherein said secondary air inlet comprises a transverse row of vertical holes.

4. The apparatus of claim 1 wherein said plurality of baffles comprises a secondary air outlet for admitting preheated air above said primary combustion zone therethough to direct said combustible products from said primary combustion zone toward said front wall.

5. The apparatus of claim 1 wherein said side and rear walls of said firebox each have a plurality of edges, further comprising a preheating chamber having a left and right side panel and a rear panel, said side panels and rear panel being attached to the edges of said side and rear walls of said firebox, said preheating chamber adapted to provide preheated secondary air for admission above said primary combustion zone.

6. The apparatus of claim 1 wherein said plurality of baffles defines a secondary combustion pathway, wherein said secondary combustion pathway is a winding passage comprising a plurality of secondary combustion zones.

7. The apparatus of claim 5 further comprising an air intake manifold disposed in said back wall for the ingress of air into said preheating chamber.

8. The apparatus of claim 5 wherein said preheating chamber includes a plurality of ducts defined by a plurality of said baffles for introducing said preheated secondary air to a secondary combustion pathway defined by said baffles.

9. The apparatus of claim 6 wherein said secondary combustion pathway has an upper end open to the top of said firebox and an open lower end, and the volume of said secondary combustion pathway gradually diminishes from said lower end to said upper end.

10. The apparatus of claim 5, said plurality of baffles comprising a lower baffle, a mid baffle, an upper baffle and a top baffle which define a secondary combustion pathway, wherein said secondary combustion pathway is a winding passage comprising a plurality of secondary combustion zones, one of which being said secondary combustion zone adjacent said window.

11. The apparatus of claim 10 wherein said lower baffle is disposed at a top portion of said firebox at an angle of 10-30 degrees above horizontal.

12. The apparatus of claim 11 wherein said angle is substantially 20 degrees above horizontal.

13. The apparatus of claim 10 wherein said mid baffle is disposed 10-30 mm above and parallel to said lower baffle.

14. The apparatus of claim 10 wherein said mid baffle is disposed at an angle of 40-50 degrees below the horizontal from said front wall such that said mid baffle and said lower baffle define a converging area of said secondary combustion pathway.

15. The apparatus of claim 10 wherein a lower edge of said upper baffle abuts and is contiguous with an upper edge of said mid baffle and extends at an acute angle between horizontal and vertical towards said front wall of said firebox and abuts said top wall at an upper edge of said upper baffle.

16. The apparatus of claim 10 wherein said top baffle extends forwards from a top edge of said rear wall at an angle of between 20 degrees and 75 degrees above horizontal and an upper edge abuts and is contiguous with said top wall.

17. The apparatus of claim 6 further comprising a plurality of secondary air outlets through said at least one baffle at each of said secondary combustion zones.

18. The apparatus of claim 17 wherein each of said secondary combustion zones and a corresponding said secondary air outlet are located at a change in direction of said secondary combustion pathway.

19. The apparatus of claim 17 wherein said secondary outlets comprise a series of slots in said at least one baffle, said slots being disposed at oblique angles to each other.

20. The apparatus of claim 15 wherein a plurality of raised ribs are disposed on an interior surface of said baffles in said secondary combustion pathway such that turbulence is created as said secondary air passes over said ribs.

21. The apparatus of claim 20 wherein said ribs are disposed in a zig-zagged pattern.

22. The apparatus of claim 19 wherein said slots are disposed at an oblique angle to all surfaces of said at least one baffle such that said preheated secondary air entering each said secondary combustion zone creates turbulence at each said secondary combustion zone.

23. The apparatus of claim 4 further comprising:
a jacket consisting of an inner back panel disposed in said firebox parallel to said rear wall, and two side panels disposed in said firebox parallel to said side walls, said back panel abutting said side panels along a left and right edge of said back panel; and
a flange extending from a bottom edge of said back panel to abut said back wall, thereby defining a preheating chamber for the provision of said preheated secondary air to a secondary combustion pathway.

24. The apparatus of claim 1 further comprising a preheating chamber having a left and right side panel and a rear panel, said side panels and said rear panel being attached to the edges of said side and rear walls of said firebox.

25. The apparatus of claim 23 further comprising an opening in said back wall adapted to allow the entrance of ambient air for pre-heating.

26. The apparatus of claim 8 further comprising a series of air outlet holes in said baffles, thereby connecting said ducts to said secondary combustion pathway.

27. The apparatus of claim 8 wherein said ducts comprise one or more sections, each said section being selected from the group consisting of: a perforated stainless steel tube, a planar stainless steel section, a porcelainized section, a high density vermiculite section, a perlite section and a calcium silicate section.

28. The apparatus of claim 1 further comprising a direct vent structure comprising two co-axially mounted stove pipes, wherein an inner pipe is adapted to vent exhaust gasses and particles of combustion from said combustion apparatus, and a co-axial outer pipe is adapted to provide preheated air to said combustion apparatus from outside a building envelope.

29. The apparatus of claim 28 wherein said vent structure is disposed on the top of said combustion apparatus adjacent to an end of a secondary combustion pathway defined by said at least one baffle.

30. The apparatus of claim 28 wherein said vent structure is disposed at a rear surface of said combustion apparatus and adjacent to an end of a secondary combustion pathway defined by said at least one baffle.

31. The apparatus of claim 28 further comprising a cowling disposed about a top and rear portion of said combustion apparatus and said vent structure, said cowling being adapted to contain exhaust gasses from said combustion apparatus.

32. The apparatus of claim 1 wherein said solid fuel comprises fuel selected from the group consisting of: wood, cord wood, coal, presto logs, bio-mass product and garbage.

33. The apparatus of claim 1 further comprising a continuous feed auger for loading said solid fuel into said combustion apparatus.

34. A method of combusting fuel comprising the steps of:
providing a stove comprising a firebox a base, a top wall, a front wall, a rear wall, two side walls extending between said base and said top wall, said front wall comprising a window and an opening to enable loading of solid fuel into said firebox, and at least one baffle disposed within the stove between a primary combustion zone and a secondary combustion zone, wherein said secondary combustion zone is disposed between said primary combustion zone and said window;
introducing primary air into the stove;
igniting said fuel in said stove thereby initiating primary combustion in the primary combustion zone;
introducing secondary air from at least one additional source disposed below said window into the secondary combustion zone within said stove;
removing exhaust from said primary combustion zone via a secondary combustion pathway adapted to support ongoing combustion in said secondary combustion zone,
wherein said secondary combustion zone is separated from said primary combustion zone by the at least one baffle and is located between said primary combustion zone and said window and is produced by way of said secondary air being directed upwards from below said window to: wash up said window, cause a secondary combustion to occur adjacent said window, and cause a resulting flame from said secondary combustion to appear to float above a base of said window;
introducing secondary air at a plurality of additional sources along said secondary combustion pathway thereby supporting said ongoing combustion at a plurality of successive secondary combustion zones; such that the temperature of said secondary combustion is higher at each successive said secondary combustion zone.

35. The method of claim 34 wherein said secondary air cleans said window and provides additional air for said primary and said secondary combustion.

36. The method of claim 34 further comprising initiating a catalytic reaction with said exhaust thereby reducing emissions of harmful exhaust gasses and heavy particulate matter from said stove.

37. The method of claim 34 further comprising direct-venting said exhaust via a stack including an outer, coaxial sheath defining a sleeve, said sleeve adapted to receive air external to said stove into said stove.

38. The method of claim 37 wherein said stack and sheath extend from the top or rear of said stove and project rearwardly from said stove at an angle of greater than 10 degrees above horizontal thereby direct-venting said exhaust.

39. The method of claim 34 wherein introducing secondary air at a plurality of successive said secondary combustion zones located along said secondary combustion pathway creates a draft which draws said exhaust upwards while cooling said exhaust.

40. The apparatus of claim 1 further comprising a firebox hearth which sits atop said base, wherein said firebox hearth is adapted to slope upwards from a rear area of said combustion apparatus towards a front area of said combustion apparatus, so as to facilitate front to back fuel loading of said solid fuel, and to cause said combustible products to flow upwards and forward from said primary combustion zone towards said window thereby mixing with said secondary air to produce said secondary combustion adjacent said window.

41. The method of claim 34 wherein said stove further comprises a firebox hearth which sits atop said base, wherein said firebox hearth is adapted to slope upwards from a rear area of said stove towards a front area of said stove, so as to facilitate front to back fuel loading of said fuel, and to cause combustible products of said fuel to flow upwards and forward from said primary combustion zone towards said window thereby mixing with said secondary air to produce said secondary combustion adjacent said window.

* * * * *